_United States Patent_ [19]

Schechter

[11] Patent Number: 5,823,049

[45] Date of Patent: Oct. 20, 1998

[54] MECHANICAL SCANNER

[75] Inventor: Stuart E. Schechter, Newton, Mass.

[73] Assignee: Synkinetics, Inc., Lowell, Mass.

[21] Appl. No.: 546,593

[22] Filed: Oct. 23, 1995

Related U.S. Application Data

[63] Continuation-in-part of Ser. No. 372,594, Jan. 13, 1995, abandoned.

[51] Int. Cl.$^6$ .................................................. F16H 21/16
[52] U.S. Cl. ..................................... 74/25; 74/63; 476/36
[58] Field of Search ................................. 74/25, 63, 112, 74/125; 476/36

[56] References Cited

U.S. PATENT DOCUMENTS

| | | | |
|---|---|---|---|
| 1,568,290 | 1/1926 | Morrison | 74/63 |
| 2,512,272 | 6/1950 | Gull | 74/63 |
| 2,660,065 | 11/1953 | Williams | 74/25 |
| 3,039,324 | 6/1962 | Waterfield | 74/63 |
| 3,049,019 | 8/1962 | Lapointe et al. | 476/36 |
| 3,343,424 | 9/1967 | Green | 74/25 |
| 3,468,175 | 9/1969 | Rabek | 74/63 |
| 3,516,267 | 6/1970 | Uhlir | 74/25 |
| 3,648,529 | 3/1972 | Illman et al. | 74/112 |
| 3,807,243 | 4/1974 | Yada | 74/63 |
| 4,584,904 | 4/1986 | Distin, Jr. et al. | 74/63 |
| 4,643,047 | 2/1987 | Distin et al. | 74/63 |
| 4,960,003 | 10/1990 | Hartley | 74/63 |
| 5,016,487 | 5/1991 | Bollmann | 476/36 |
| 5,321,988 | 6/1994 | Folino | 74/25 |

FOREIGN PATENT DOCUMENTS

| | | |
|---|---|---|
| 24020 | 2/1922 | France . |
| 1021945 | 2/1953 | France . |
| 59-133863 | 8/1984 | Japan . |
| 59-180153 | 10/1984 | Japan . |
| 629387 | 9/1978 | U.S.S.R. . |
| 1257331 | 9/1986 | U.S.S.R. . |
| 1399548 | 12/1986 | U.S.S.R. . |
| 1368545 | 1/1988 | U.S.S.R. . |
| 1490362 | 6/1989 | U.S.S.R. . |
| 1569470 | 6/1990 | U.S.S.R. . |
| 710543 | 6/1952 | United Kingdom . |

OTHER PUBLICATIONS

Abstract, Japan, Patent, 60–146954 (A) Feb. 8, 1985.
Abstract, Japan, Patent, 60–4663 (A) Nov. 1, 1985.
Abstract, Japan, Patent, 60–179563 (A) Sep. 13, 1985.
Abstract, Japan, Patent, 60–129462 (A) Jul. 10, 1985.
Abstract, Japan, Patent, JP 890072449 Mar. 24, 1985.
Mechanical Engineering & Technology Article, Balls Reduce Speed and Transmit Toryne: Publ. Prior to Mar. 14, 1991.
Dojen™ Precision Rotary Actuator Designer's Guide, (Dir. of Lenze, Woburn, MA); Publ. Prior to Mar. 14, 1991.
Soviet Engineering Research vol. 6 (1986) Feb., No. 2, @ pp. 23–26, Mowbray, Leicestershire G.B.; V. Mechinostroeniya: "Gen'l Info . . . ".

_Primary Examiner_—Khoi Q. Ta
_Attorney, Agent, or Firm_—James E. Maslow

[57] ABSTRACT

A method and apparatus are provided for a scanning output from a rotary input based upon the cooperation of a continuous track and a discontinuous track via at least one interacting element.

12 Claims, 7 Drawing Sheets

MECHANICAL SCANNER

This application is a continuation-in-part U.S. patent application Ser. No. 08/372,594, filed Jan. 13, 1995, entitled: VARIABLE OUTPUT SPEED DRIVE, Attorney Docket Number FFY-005CIP2, incorporated herein by reference.

BACKGROUND OF THE INVENTION

The present invention relates to mechanical scanning devices, and more particularly, to scannners having low parts count.

In many work applications it is necessary to redirect a stream or path from a source to a destination. Currently there are several devices available to redirect electromagnetic radiation. Acousto-optic and electro-optic devices work by applying a force field to a material which by changing material characteristics redirects a beam passing through the material. These devices are usually limited to low power situations due to the material absorption of some of the incoming beam power. Another type of beam director is a galvanometer. These devices use a limited travel motor to turn a single face mirror through the required displacement. The galvo-scanner is limited by the mechanical requirement of accelerating and decelerating after each excursion. Another type of scanner is the rotating polygon scanner. This device uses a multi-faceted polygon rotating in a single direction at a constant speed. The rotating facet causes the beam to be redirected and at the edge between facets causes the beam to return to the original position. The limit of this device is the amount of beam walk and the need for high quality and well aligned polygon facets.

Generally, there are two types of scanning, raster and vector. Raster scanning is usually a constant sweep of a reflective surface over a beam path. At the end of a sweep the scanner may swing back to the beginning using what is called a blanking pulse or may sweep backward in the same manner as the forward sweep. A vector scan usually means that a reflective surface is moved to a specific point within the scan range and caused to dwell there for a period of time before moving to another point. The points do not have to be in any necessary sequence.

It is therefore an object of the present invention to provide a scanner capable of redirecting a path as required for an application.

It is another object of the present invention to provide a low parts-count scanner having robust capabilities.

It is a further object of the present invention to provide a scanner which is relatively easy to assemble and service.

SUMMARY OF THE INVENTION

These and other objects are well met by the presently disclosed, highly efficient, scanning device assembly. In one aspect of the invention, this invention relates to changing rotary motion to oscillatory motion in order to redirect an in-coming stream or path. In particular, this invention can be used to redirect a path, such as of electromagnetic radiation, which includes, but is not limited to, radio waves, electron beams, laser beams or any other radiation.

A preferred embodiment of the invention provides a constant speed raster scan using constant speed input, as in the rotary prism type scanner, but with an oscillatory output, as in the galvo-scanner, to produce redirection of an in-coming stream, beam or path.

This invention is directed at, but not limited to, electromagnetic radiation. This invention can also redirect water jets, conveyer outputs, and other streams beams or paths.

In a preferred embodiment of the invention, rotary motion is translated from a first to a second angular velocity, using a conjugate pair of devices rotatable about a common axis, and an interacting element interposed between the conjugate pair, and also located about the common axis, for translating constant rotary motion of a first of the devices to oscillatory motion of a second of the devices.

The conjugate pair of devices preferably includes a drive cam and a driven cam, having a drive shaft coupled to the drive cam and a driven shaft coupled to the driven cam, according to the teachings of U.S. Pat. No. 5,321,988, incorporated herein by reference. The translation arrangement may include a reaction disk axially and rotationally fixed and having at least one radially extending slot for interaction with a rolling element, or a cylindrical retainer axially and rotationally fixed and having at least one axially extending slot for interaction with a rolling element. Preferably the slot defines a centerline which is the loci of the contact of the conjugate pair of devices (drive and driven cams) and the center of the rolling interacting element, along the length of the slot.

In another embodiment of the invention, a speed converter includes a drive member having a drive cam and a driven member having a driven cam, a plurality of transmission elements (such as balls) and a reaction disk having a plurality of slots for respective receipt of the balls, all within a common housing. One of the cams is a continuous track and the other of the cams is a discontinuous track.

The invention produces an oscillatory output form a constant velocity for 360 degrees rotation at the input, with torque transmission through each of the transmission elements for 360 degrees of rotation at the input. All of the transmission elements share the load continuously, thereby decreasing the unit load on each transmission element, except as any transmission element makes a transition in its radial or axial direction of travel.

In one embodiment, there is zero backlash since all of the transmission elements are in contact and under preload.

The present invention preferable has a conjugate pair of track devices rotatable about a common axis, at least one rolling element, a retainer part having an elongated slot with the rolling element the slot. A first of the pair has a continuous track and a second of the pair has a discontinuous track. The tracks interact via the element in the slot. The retainer part is connected to the housing via the coupling part. In one embodiment the coupling part includes a modulation device for modulating the grounding of the reaction disk to vary the scanning rate on the fly.

The invention further preferably has an arrangement for spindling one of the devices between the retainer part and housing as an input part and spindling the other of the devices in the retainer part as an output part. The output part oscillates when the input part is rotated.

Alternatively, the slot (or plurality of slots) is axially or radially extending and the translating means has either a disk-like or cylindrical retainer device forming a reaction part or reaction disk. The reaction disk then preferably has a plurality of slots for receipt of a plurality of reaction elements, or balls, with a respective one of the elements associated with a respective one of the slots.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF A PREFERRED EMBODIMENT

Figure 1:
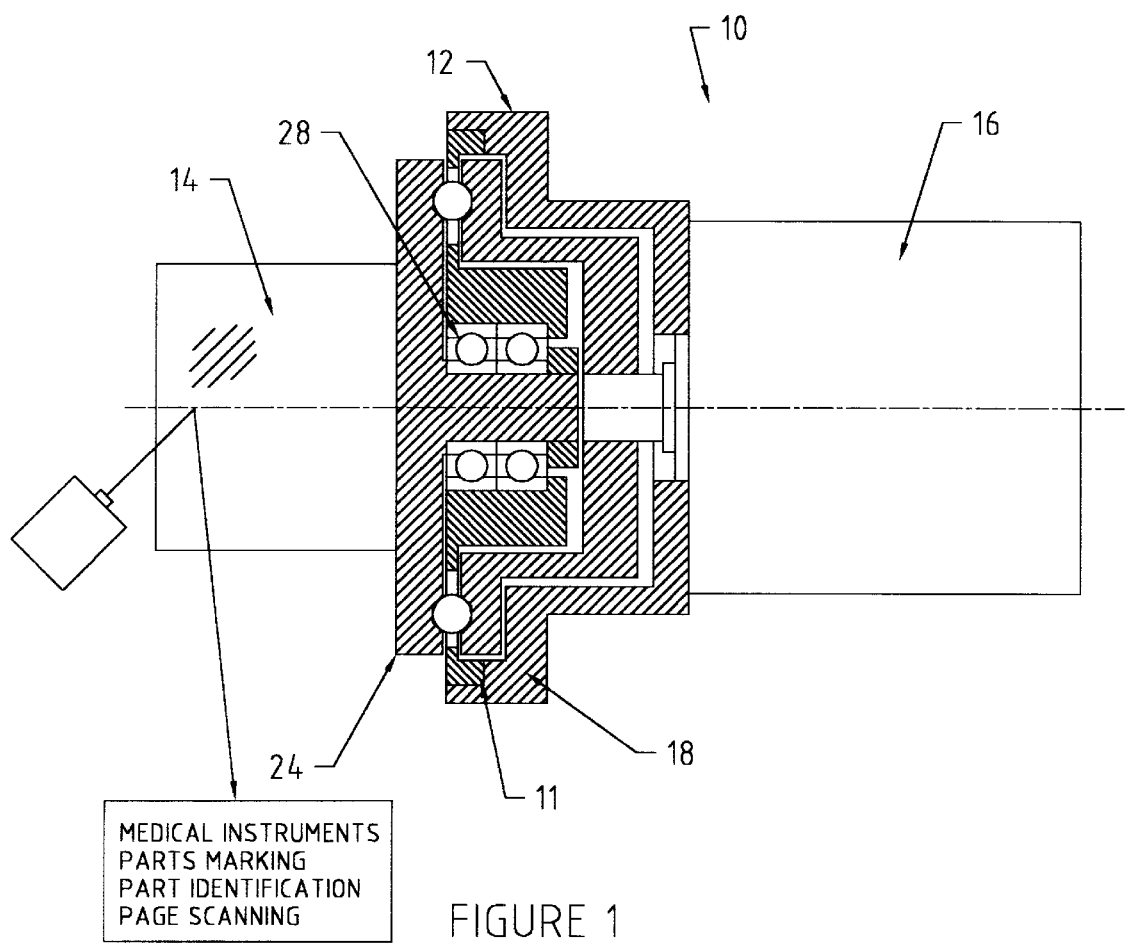
FIG. 1 is an assembly drawing of a raster scanner according to the embodiment of the present invention.

The raster scanner assembly 10 presented in FIG. 1 consists of three subassemblies, the oscillatory assembly 12 the reflector assembly 14 and a motor assembly 16.

Figure 2:
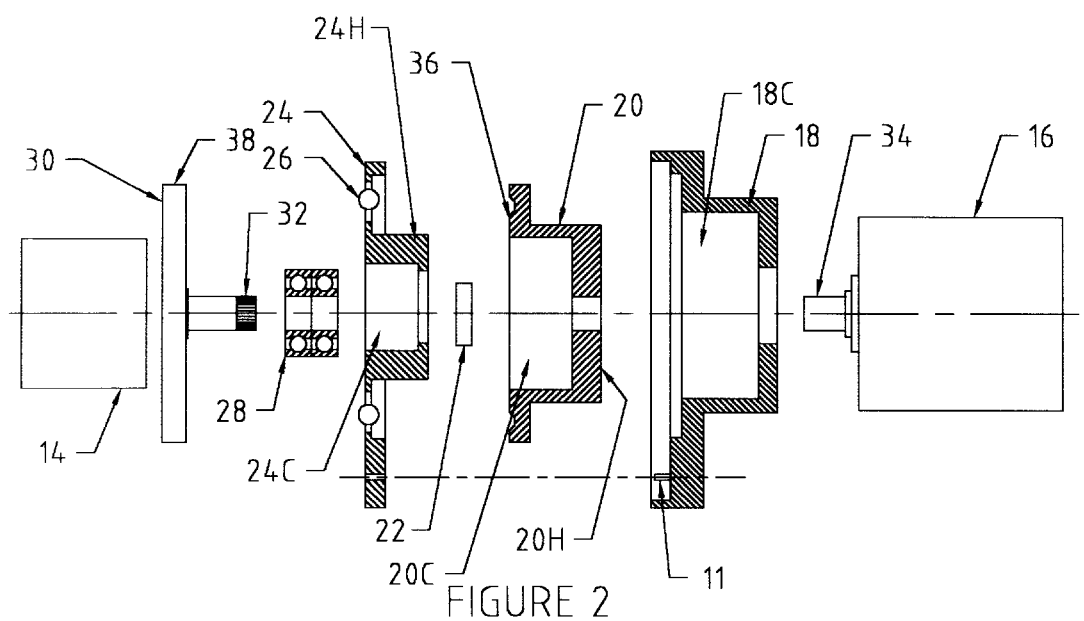
FIG. 2 is an expanded view of the raster scanner assembly detailing the individual parts.

An expanded view of the raster scanner assembly 10 is presented in FIG. 2 with the oscillatory assembly 12 detailed. The oscillatory assembly housing 18 is mounted and aligned using features associated with the motor 16. The drive cam 20 is mounted to the motor shaft 34 and is caused to rotate at a speed determined by the motor speed. Housing 18 forms a cup 18C on one of its sides facing drive cam 20. Drive cam 20 has a hub 20H formed on its motor side and a cup 20C formed on its other side. Hub 20H mates with cup 18C of housing 18. The drive cam 20 has a groove cut into the front face 36 in which the ball(s) 26 conform to the geometry as the drive disk 20 rotates. housing 18 forms a cup 18C on one of its sides facing drive cam 20. Drive cam 20 has a hub 20H formed on its motor side and a cup 20C formed on its other side. Hub 20H mates with cup 18C of housing 18. The drive cam 20 has a groove cut into the front face 36 in which the ball(s) 26 conform to the geometry as the drive disk 20 rotates.

The reaction disk 24 incorporates a bearing 28 and is mounted to the housing 18 via coupling 11 (see FIG. 1, FIG. 2 and FIG. 6) to form the rigid structure on which the system will react forces. More specifically, reaction disk 24 forms a hub 24H on its one side and a cup 24C on its other side. Hub 24H mates into drive cam cup 20C. Reaction disk cup 24C receives bearing 28. The reaction disk 24 has slots cut through the disk on which the ball(s) 26 will react torsional forces.

By virtue of this arrangement, the drive cam 20 and driven cam 30 are spindled via the reaction disk 24 and housing 18 to permit the rotary motion of the motor 16 to be converted to and result in oscillatory motion at the mirror 14.

The driven disk 30 is mounted to the bearing 28 by a shaft 32 and is captured to the bearing by a retainer 22. The motion of the ball(s) 26 caused by the drive disk 20 and reacted by the reaction disk 24 are translated to grooves 42 cut into the back surface 38 of the driven disk 30 which cause the driven disk 30 to oscillate.

A reflective surface 14 attached to the driven disk 30 will therefore also oscillate as dictated by the combination of drive disk 20, reaction disk 24 and driven disk 30.

Figure 3:
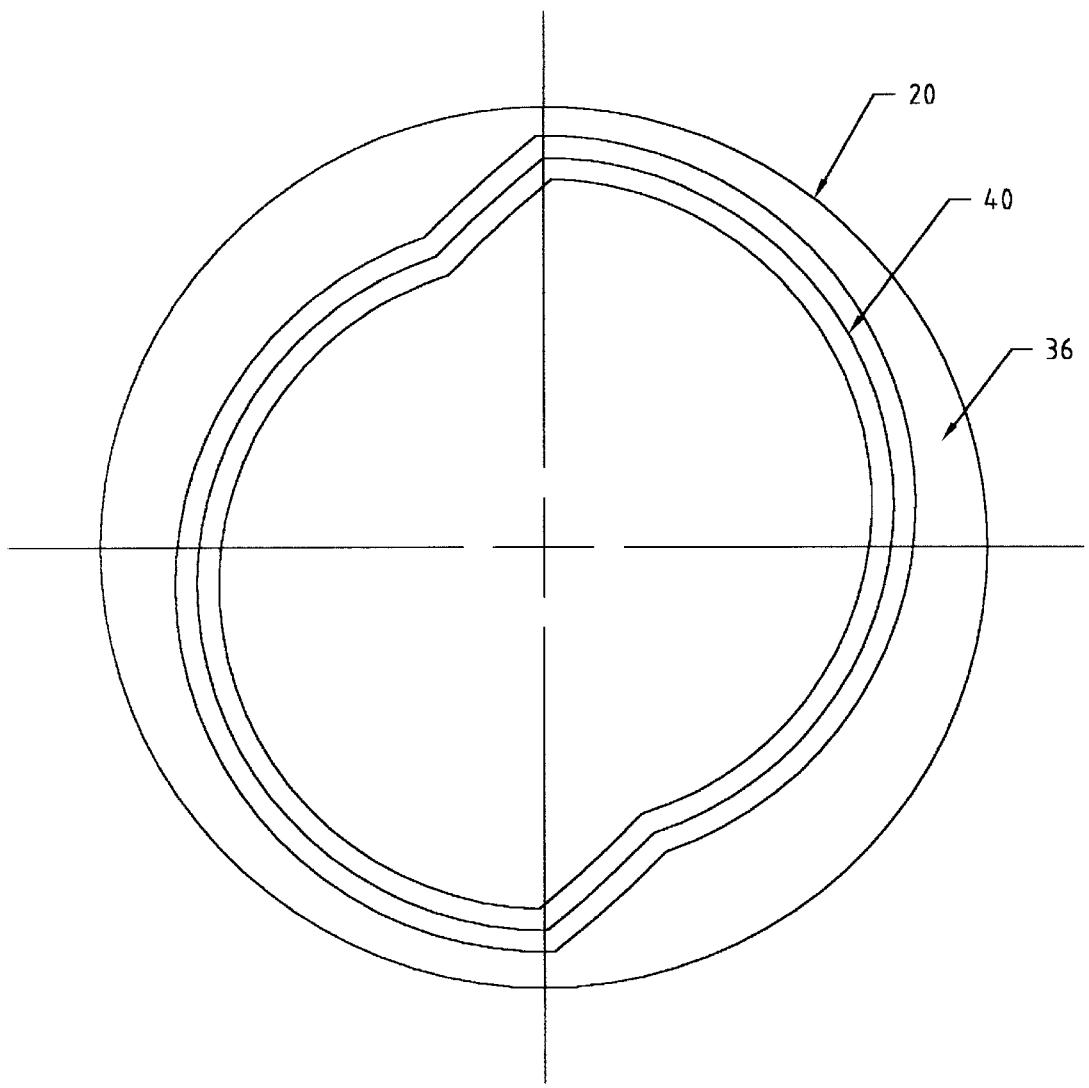
FIG. 3 is a front view of the drive cam showing the fabricated race. This profile demonstrates an 85 percent scan efficiency.

The raster scanner assembly 10 drive cam 20 front view is presented in FIG. 3. The drive disk 20 shows the functional race 40 which has been prescribed on the front surface 36.

Figure 4:
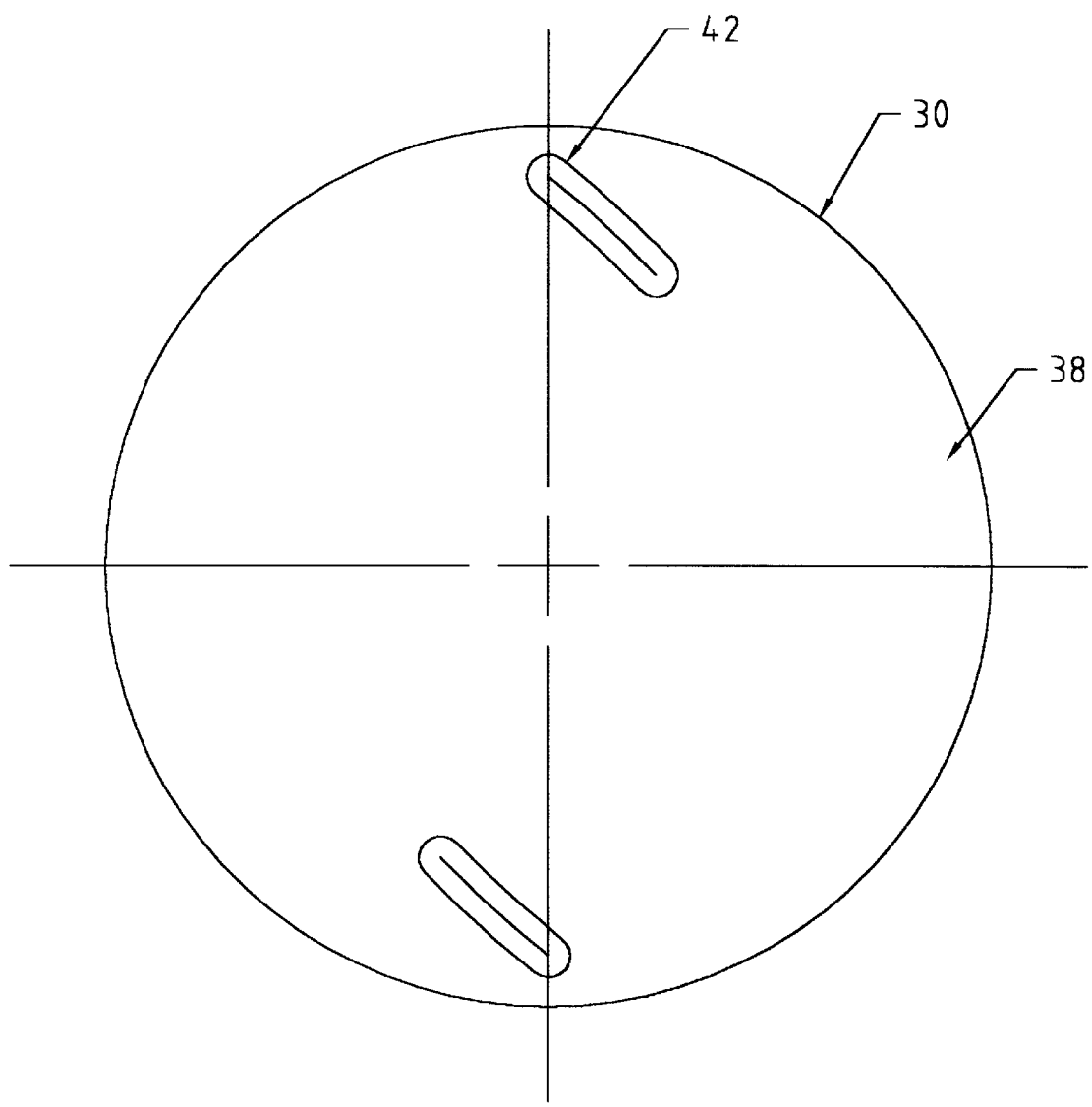
FIG. 4 is a front view of the driven cam showing the fabricated race. This profile demonstrates a 15 degree mechanical scan stroke.

The raster scanner assembly 10 driven cam 30 front view is presented in FIG. 4. The drive disk 30 shows the functional race 42 which has been prescribed on the front surface 38.

Figure 5:
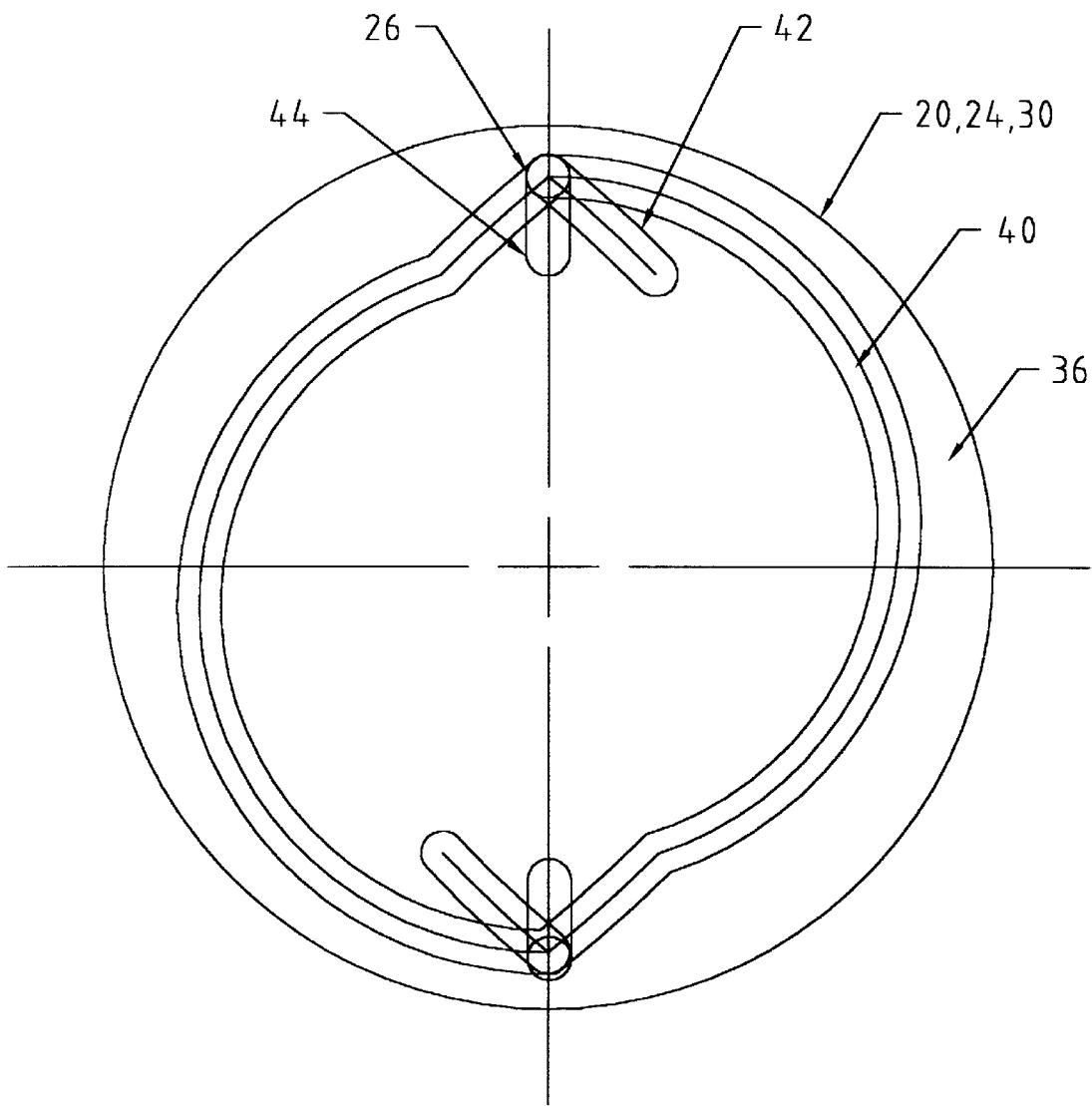
FIG. 5 is an assembly view showing the relationship between the drive and driven cams.

The raster scanner assembly 10 front view with transparent layers for clarity is presented in FIG. 5. The drive disk 20, reaction disk 24 and the driven disk 30 are shown stacked up in line and embodies the relationship between the drive race 40, the driven race 42, the reaction disk slots 44 and the ball 26.

A preferred embodiment of the invention provides a constant speed raster scan using constant speed input, as in the rotary prism type scanner, but with an oscillatory output, as in the galvo-scanner, to produce redirection of an in-coming electromagnetic beam.

Figure 6:
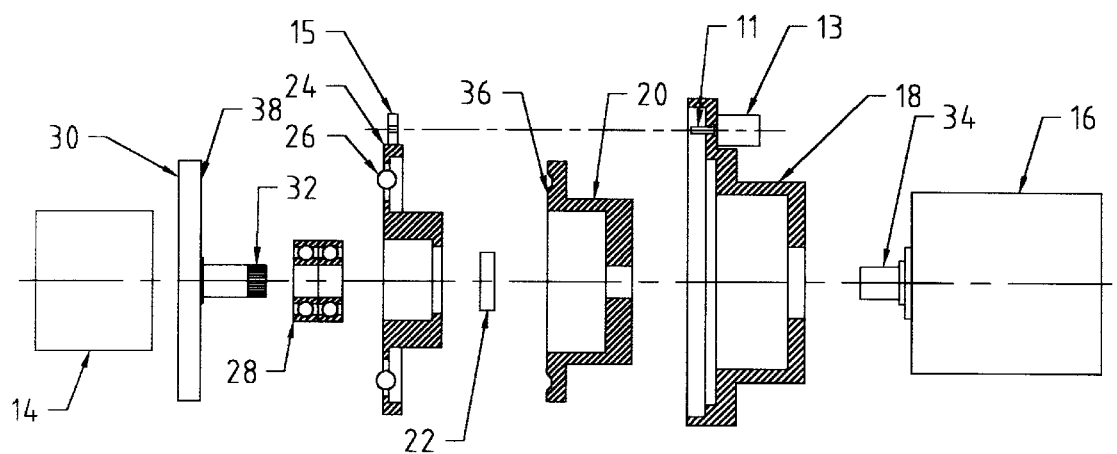
FIG. 6 is an expanded view of an alternative modulatable scanner assembly of the invention.

In another aspect of the invention, an apparatus is provided for converting a rotary input to a scanning output. The apparatus is shown in FIG. 6 having reaction disk 24 connected to housing 18 via modulator 13 and hard coupling 11 which terminates at rubber wheel 15 mounted against the periphery of reaction disk 24. Modulator 13 can be a motor that rotates the reaction disk at the rate of the motor rotor, or grounds the reaction disk when the motor rotor is held fixed. In the embodiment of FIG. 1, the reaction disk 24 is grounded to the housing 18. In the embodiment of FIG. 6 the grounding of reaction disk 24 to housing 18 is modulated as desired to vary the scanning rate according to the modulation. A preferred embodiment of modulator 13 is taught in U.S. patent application Ser. No. 08/372,594, incorporated herein by reference.

Figure 7A:
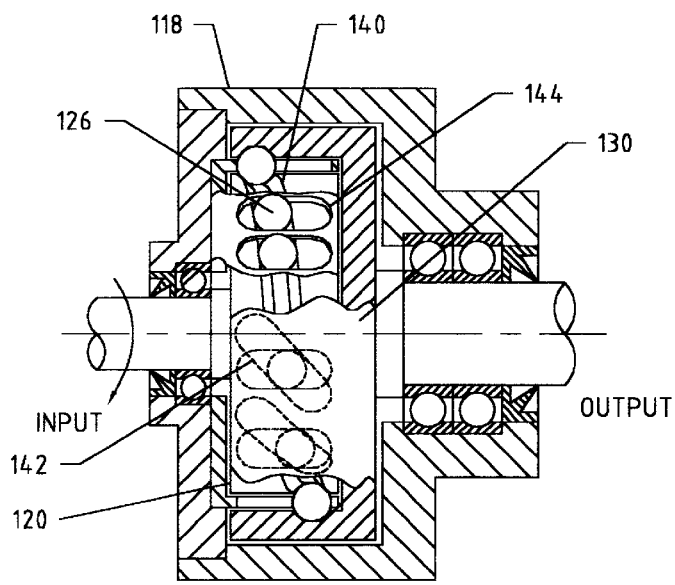
FIG. 7 (a,b) shows a cylindrical embodiment of the invention.
Figure 7B:
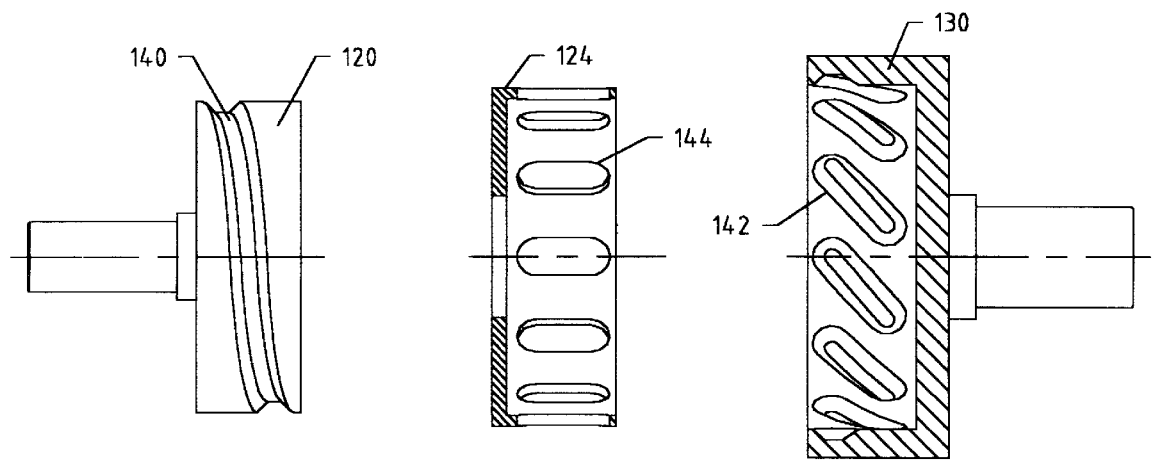

A cylindrical embodiment of the invention is shown in FIG. 7 (a,b) having housing 118, which receives drive cam 120 with track 140, reaction disk 124 having slots 144 and driven cam 130 with its track 142. The driven disk mounted by a bearing on a shaft and is captured to the bearing. The motion of the ball(s) 126 caused by the drive disk track 140 and reacted by the reaction disk 124 are translated to grooves 142 cut into the back surface of the driven disk 130 which causes the driven disk 130 to oscillate as the drive cam is rotated. A reflective surface attached to the driven disk will therefore also oscillate as dictated by the combination of drive disk, reaction disk and driven disk.

It will now be appreciated that a scanner made in accordance with the teachings of the present invention will have an range of motion and flyback efficiency dictated by the relationship of the conjugate pair of drive cam and driven cam. Various modifications of the specific embodiments set forth above are also within the spirit and scope of the invention. Furthermore, a translation device with other than constant angular velocity may be developed for special applications. Uses include medical instruments, parts marking, parts identification, page scanning and the like. The scope of the invention is as set forth in the following claims.

What is claimed is:

1. Apparatus for converting a rotary input to a scanning output, the apparatus comprising a housing, a conjugate pair of devices rotatable about a common axis, at least one rolling element, a retainer part having an elongated slot, said element fitting in said slot, a first of said pair having a continuous track and a second of said pair having a discontinuous track, said tracks interacting via said element in said slot, a coupling part, said retainer part connected to said housing via said coupling part, means for spindling one of said devices as an input part and the other of said devices as an output part, one of said devices mounted between said retainer part and said housing and the other of said devices mounted in conjunction with said retainer part, said retainer part and one of said devices each having a cup portion and a hub portion, one of said cup Portions nested in one of said hub portions, the other of said devices having a hub portion that nests with the other of said cup portions, wherein said output part oscillates when said input part is rotated.

2. The apparatus of claim 1 wherein a first of the pair of devices comprises a drive cam and second of the pair of devices comprises a driven cam.

3. The apparatus of claim 1 wherein the translating means comprises a reaction disk device.

4. The apparatus of claim 3 wherein said slot is axially extending.

5. The apparatus of claim 3 wherein said slot is a radially extending.

6. The apparatus of claim 1 wherein the translating means comprises a cylindrical retainer device.

7. The apparatus of claim 3 wherein the reaction disk comprises a plurality of slots, for receipt of plurality of reaction elements, with a respective one of the elements associated with a respective one of the slots.

8. The apparatus of claim 6 wherein the elements are balls.

9. The apparatus of claim 1 wherein the retainer part is rotatable.

10. The apparatus of claim 9 wherein the coupling part includes a modulator, wherein said retainer part can be rotated by action of the modulator to control the rate of oscillation at said output.

11. The apparatus of claim 10 wherein the modulator comprises a motor coupled between the housing and the retainer part.

12. The apparatus of claim 1 wherein the slot defines a centerline which is the loci of the contact of (a) the conjugate pair of devices and (b) the center of the interacting element, along the length of the slot.

* * * * *